United States Patent
Yasuda et al.

(10) Patent No.: US 8,420,178 B2
(45) Date of Patent: Apr. 16, 2013

(54) LIQUID SENDING METHOD AND SYSTEM

(75) Inventors: Kenichi Yasuda, Minami-Ashigara (JP); Hitoshi Satou, Odawara (JP); Kazuhiro Oki, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 466 days.

(21) Appl. No.: 12/585,689

(22) Filed: Sep. 22, 2009

(65) Prior Publication Data

US 2010/0075030 A1    Mar. 25, 2010

(30) Foreign Application Priority Data

Sep. 24, 2008  (JP) ................. 2008-244457

(51) Int. Cl.
  *B05D 1/02*  (2006.01)
(52) U.S. Cl.
  USPC .......... 427/421.1; 118/50; 118/325; 118/692; 137/7; 137/14; 137/262; 137/561 R; 427/162; 427/168
(58) Field of Classification Search ........... 427/421.1, 427/162, 168; 137/1, 7, 14, 561 R, 262; 118/50, 300, 325, 692
See application file for complete search history.

(56) References Cited

U.S. PATENT DOCUMENTS 4,150,696 A * 4/1979 Meier et al. ............ 138/44
5,098,263 A   3/1992 Hattori et al.

FOREIGN PATENT DOCUMENTS

| JP | 03-092694 A   |   | 4/1991 |
| JP | 11-270429     |   | 10/1999 |
| JP | 2006-156655   |   | 6/2006 |
| JP | 2006156655 A  | * | 6/2006 |
| JP | 2007245024 A  | * | 9/2007 |
| JP | 2008-075537 A |   | 4/2008 |

* cited by examiner

*Primary Examiner* — Michael Cleveland
*Assistant Examiner* — Alexander Weddle
(74) *Attorney, Agent, or Firm* — Jean C. Edwards, Esq.; Edwards Neils PLLC

(57) ABSTRACT

A liquid sending method comprises the steps of sending a coating solution to a liquid sending pipe, passing the coating solution to an orifice which is provided at a part of the liquid sending pipe to prevent a vibration propagation and passing the coating solution to a pulsation absorb device which is provided at a part of the liquid sending pipe where is located at a downstream of the orifice, wherein the pulsation absorb device includes a first chamber that a liquid can flow in and out, a second chamber which is introduced a gas, and a diaphragm which separates the first chamber and the second chamber.

10 Claims, 5 Drawing Sheets

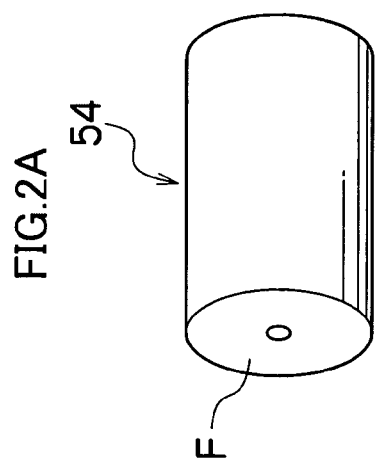
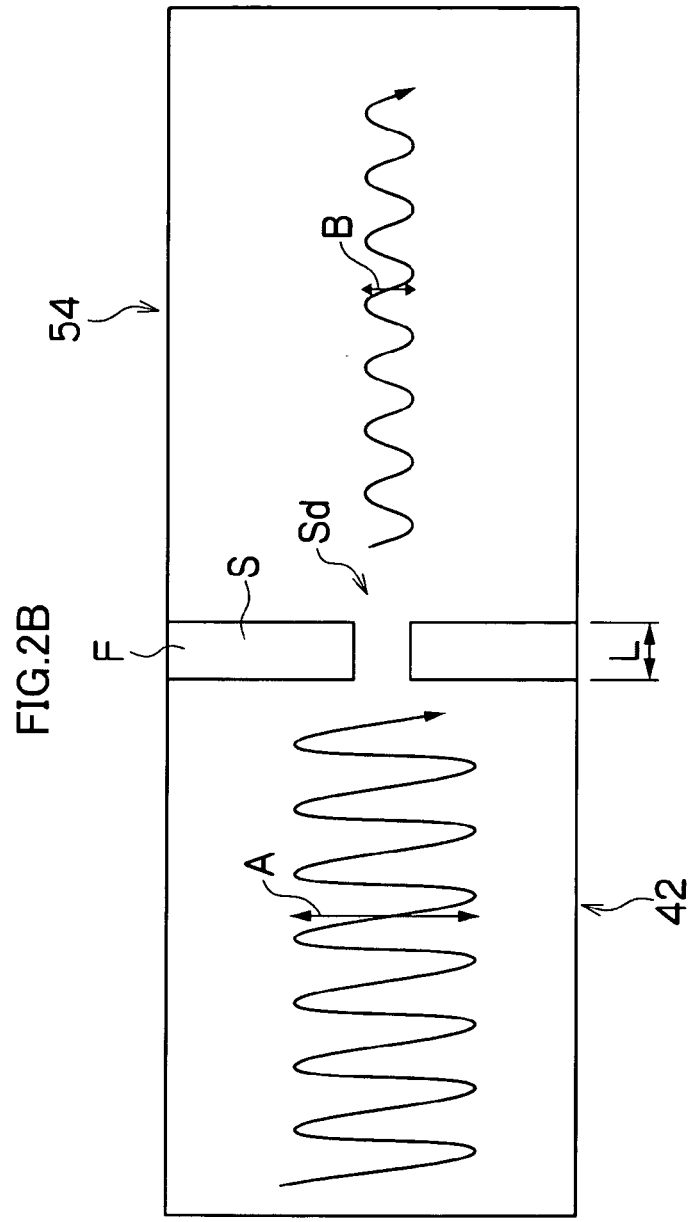

FIG.5

| LEVEL NO | VISCOSITY (mPa-s) | NONDIMENSIONAL NUMBER Re NUMBER | ORIFICE SHAPE AREA RATIO | ORIFICE PRIMARY PRESSURE (MPa) | NUMBER OF ORIFICE | PULSATION ABSORB DEVICE WITH/WITHOUT | PULSATION (%) | STEP UNEVENNESS SURFACE CONDITION SENSORY EVALUATION | DETERMINATION |
|---|---|---|---|---|---|---|---|---|---|
| EMBODIMENT1 | 1 | 2500 | 0.01 | 80 | 2 | WITH | 0.5 | G | G |
| EMBODIMENT2 | 1 | 4800 | 0.01 | 110 | 2 | WITH | 0.7 | G | G |
| EMBODIMENT3 | 1 | 8000 | 0.01 | 250 | 2 | WITH | 1.0 | G | G |
| EMBODIMENT4 | 1 | 4800 | 0.01 | 50 | 1 | WITH | 1.2 | G | OK |
| EMBODIMENT5 | 1 | 7000 | 0.005 | 110 | 1 | WITH | 1.0 | G | G |
| EMBODIMENT6 | 1 | 4800 | 0.01 | 110 | 2 | WITH | 0.5 | G | G |
| EMBODIMENT7 | 5 | 2500 | 0.01 | 150 | 2 | WITH | 1.0 | G | G |
| EMBODIMENT8 | 10 | 2500 | 0.01 | 200 | 3 | WITH | 1.0 | G | G |
| EMBODIMENT9 | 10 | 4000 | 0.01 | 300 | 4 | WITH | 1.0 | G | G |
| COMPARATIVE EXAMPLE1 | 3 | 2500 | 0.01 | 110 | 2 | W/O | 2.0 | F | F |
| COMPARATIVE EXAMPLE2 | 1 | 2500 | 0.01 | 80 | 2 | W/O | 2.5 | F | F |
| COMPARATIVE EXAMPLE3 | 1 | 4800 | 0.01 | 110 | 2 | W/O | 3.0 | F | F |
| COMPARATIVE EXAMPLE4 | 1 | 8000 | 0.01 | 250 | 2 | W/O | 2.0 | F | F |
| COMPARATIVE EXAMPLE5 | 1 | 4800 | 0.07 | 60 | 4 | W/O | 4.0 | F | F |
| COMPARATIVE EXAMPLE6 | 1 | 2000 | 0.01 | 110 | 2 | W/O | 0.5 | G | G |
| COMPARATIVE EXAMPLE7 | 5 | 2500 | 0.01 | 150 | 2 | W/O | 2.0 | F | F |
| COMPARATIVE EXAMPLE8 | 10 | 2500 | 0.01 | 200 | 3 | W/O | 2.0 | F | F |
| COMPARATIVE EXAMPLE9 | 10 | 4000 | 0.01 | 300 | 4 | W/O | 3.0 | F | F |

LIQUID SENDING METHOD AND SYSTEM

CROSS-REFERENCE TO RELATED APPLICATIONS

The present application claims priority from Japanese Patent Application No. 2008-244457, filed Sep. 24, 2008, the contents of which are herein incorporated by reference in their entirety.

BACKGROUND OF THE INVENTION

1. Field of the Invention

The present invention relates to a liquid sending method and system. More specifically, the invention relates to the liquid sending method and system which can prevent or reduce a pulsation generated in a sending process.

2. Description of the Related Art

In the past, there were problems such as occurrences of an uneven coating and a vibration noise when the pulsation was generated in the sending process.

In Japanese Patent Application Laid-Open No. 2006-156655 discloses a liquid sending method with using a structure which absorbs the pulsation by a gas pressure control device isolated with a thin film in the middle of the liquid sending. Also, Japanese Patent Application Laid-Open No. H11-270429 discloses a method of preventing a pressure fluctuation by enlarging a sliding resistance with reducing a clearance between a valve body and a sliding part.

SUMMARY OF THE INVENTION

However, it is possible to control the pulsation precisely with the method of Japanese Patent Application Laid-Open No. 2006-156655, but it requires to prepare an absorb volume according to a fluctuation, and to clean the device in the middle of the process when a secondary failure is generated because of an accumulation of the liquid in the device which is enlarged as the flow rate becomes bigger.

On the other hand, the method of Japanese Patent Application Laid-Open No. H11-270429 requires to maintain a very small clearance having a micrometer size, so it also requires to provide a special filter which has a high pressure loss in the liquid sending process to prevent a clog.

It is known that providing of a throttle feature such as an orifice in the pathway of the liquid sending has effect to control a propagation of the pulsation (pressure fluctuation).

However, it has been required to reduce an imperceptible pressure fluctuation and to perform the regular liquid sending because there is a case that the throttle feature cannot attenuate or a pulsation is newly generated as passing the throttle feature.

The present invention has been made in view of the above circumstances and has an object to provide a liquid sending method and system which is able to absorb a pulsation generated by an imperceptible pressure fluctuation.

To obtain the object above, a liquid sending method of the present invention includes the steps of sending a coating solution to a liquid sending pipe, passing the coating solution to an orifice which is provided at a part of the liquid sending pipe to prevent a vibration propagation, and passing the coating solution to a pulsation absorb device which is provided at a part of the liquid sending pipe where is located at a downstream of the orifice, wherein the pulsation absorb device includes a first chamber that a liquid can flow in and out, a second chamber which is introduced a gas and a diaphragm which separates the first chamber and the second chamber.

To obtain the object above, a liquid sending system of the present invention includes the liquid sending pipe sending the coating solution the orifice which is provided at the part of the liquid sending pipe to prevent the vibration propagation and the pulsation absorb device which is provided at the part of the liquid sending pipe where is located at the downstream of the orifice, wherein the pulsation absorb device includes the first chamber that a liquid can flow in and out, the second chamber which is introduced a gas, and the diaphragm which separates the first chamber and the second chamber.

According to the present invention, a relative large pulsation which occurs from pumping and depressurize defoaming in the middle of the liquid sending process is absorbed and reduced by the orifice, and the imperceptible pulsation secondary occurs from the orifice is absorbed and reduced by the pulsation absorb device having a diaphragm. For example, when the present invention is applied to the coating method, it is possible to apply the coating solution to a substrate with an even thickness.

It is preferred that a Reynolds number at the time that the coating solution passes through a hole of the orifice is not less than 2500 in the liquid sending method of the present invention according to the aspect above.

It is possible to prevent the imperceptible pulsation effectively at a state of disturbed flow with the Reynolds number Re of 2500 or more when the coating solution passes through the hole of the orifice.

A foam formation phenomenon called a cavitation could occur when the Reynolds number Re is big according to the shape of the orifice. The foam state becomes worse, the vibration of the pipe itself occurs. In order to prevent the liquid pulsation due to the vibration, it is required to choose the shape of the orifice and the Reynolds number Re properly.

In an opposite manner, when the Reynolds number Re is not more than 2500, the flow after passing the hole of the orifice becomes stable and the imperceptible pulsation does not occur, so the pulsation absorb device is not necessary.

On the other hand, even when the Reynolds number Re is not less than 2500, the pulsation generated by the orifice can not be eliminated with the device configuration that the orifice is provided after the pulsation absorb device. Thus, it is impossible to solve the problem.

It is preferred that an area ratio between the cross sectional area of the hole of the orifice and the cross sectional area of the path at the upstream of the orifice is not more than 0.05 in the liquid sending method of the present invention according to the aspect above.

A primary pressure of the orifice can be increased by adjusting the area ratio between the cross sectional area of the hole of the orifice and the cross sectional area of the upstream of the orifice is set to 0.05 or less. In this way, the pulsation absorption or reduction by the orifice can be performed more effectively.

It is preferred that a plurality of the orifice is provided at a part of the liquid sending pipe cross sectional area in the liquid sending method of the present invention according to the aspect above.

It is possible to increase the primary pressure of the orifice effectively by providing the plurality of the orifice. Additionally, when the orifice is one, the orifice clogs with dirt because the diameter of the hole becomes smaller, but the diameter of the hole can be made bigger by providing the plurality of the orifice.

According to the present invention, it is possible to provide the coating method without an uneven coating by absorbing the pulsation occurred from the imperceptible pressure fluctuation.

BRIEF DESCRIPTION OF THE DRAWINGS

FIG. 1 is a configuration diagram of a coating process which a liquid sending method of the present invention is applied to;

FIGS. 2A and 2B are schematic configuration diagrams which show an example of an orifice;

FIG. 5 is a table showing conditions and results of embodiments.

DETAILED DESCRIPTION OF THE PREFERRED EMBODIMENT

Referring to the accompanying drawings, a detailed description will be given below of preferred embodiments of the present invention. The present invention is described with the preferred embodiments given below, but it is possible to be changed by a number of methods without departing from the scope of the present invention and the embodiments other than the present embodiment can be applied. Thus, all of the changes which is made in the scope of the present invention is included in the scope of the claims.

The numerical range which is shown by using "to" in the present specification includes the values sandwiching "to".

Figure 1:
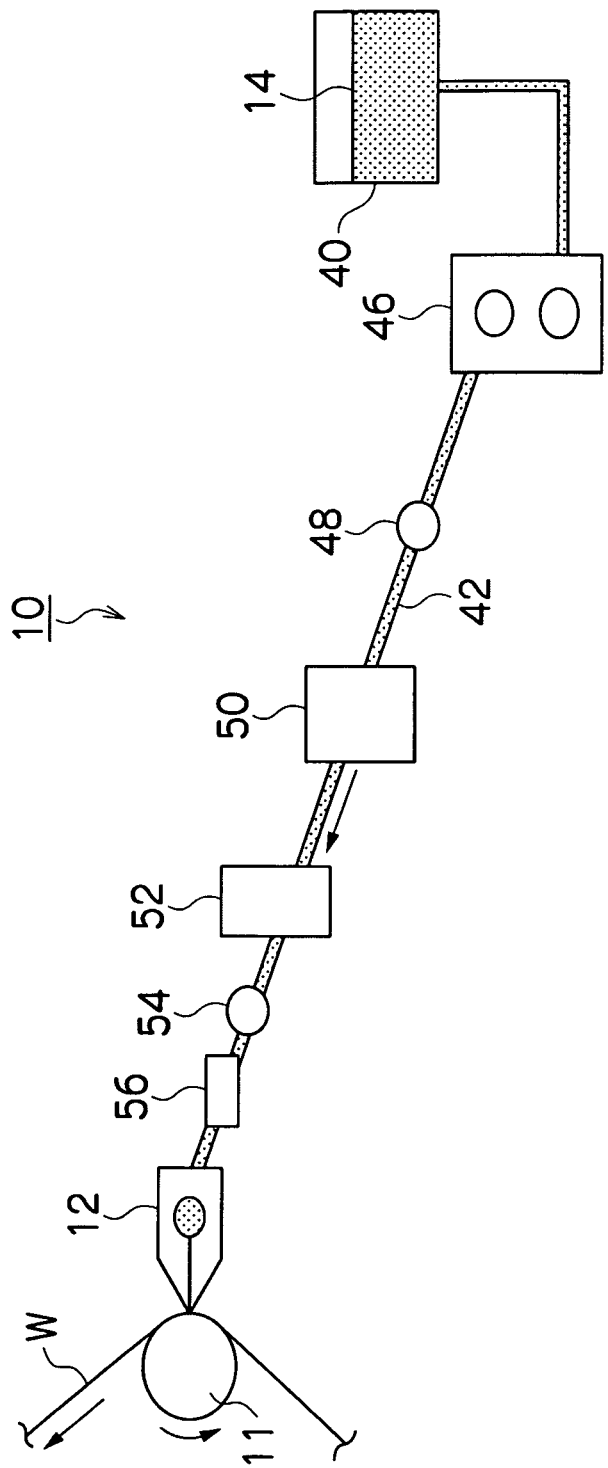

FIG. 1 is a configuration diagram of a coating process 10 of an optical film manufacturing line which a liquid sending method of the present invention is applied to.

A plurality of the processes such as a coating process, a drying process (and also the process of hardening a coated layer) and so on are arbitrarily provided as needed between the processes of winding a rolled state substrate film (hereinafter called "web") W up, and sending the web continuously in the optical film manufacturing line.

A slot die 12 is provided to face to a coating roller 11 which the web W is wound up at a coating position in the coating process 10 shown in FIG. 1. The slot die 12 is connected to a coating solution tank 40 which accumulates a coating solution 14 via a liquid sending pipe 42. The coating solution 14 is supplied to the slot die 12.

A liquid sending pump 46, a pressure gauge 48, a depressurizing deairation device with a filter 50, a flowmeter 52, an orifice 54 and a pulsation absorb device 56 are connected to the liquid sending pipe 42 in the order of the provided location from the upstream to the downstream.

As the liquid sending pipe 42, a fluorine resin in straight shape, or a metal member having a polished inner periphery, which has an inner diameter of 15 mm or less is preferred. In this way, by using the fluorine resin in straight shape (for example "Teflon (registered trademark)"), or the metal member having the polished inner periphery as the liquid sending pipe 42, the flow of the coating solution 14 in the pipe becomes favorable, thereby it is effective to eliminate air bubbles.

Also, it is preferred to reduce a vibration propagation of the liquid sending pipe 42 before the orifice 54 to eliminate the pulsation of the liquid sending from the liquid sending line. Accordingly, configurations such as 1) using the fluorine resin (for example "Teflon (registered trademark)") with low stiffness as the pipe itself, 2) using a pipe with a state of a bellows with a thin pipe wall, 3) providing a vibration isolator, and like are preferred.

As the liquid sending pump 46, various types of conventional pumps (a gear pump etc.) can be employed. Especially, a diaphragm pump can be preferably used. In other word, when pressurization is generated in the slot die 12 and the liquid sending pipe 42, it is preferred that the liquid sending pump 46 to send the coating solution 14 is the diaphragm pump.

There is a phenomenon called "passing through" depending on the type of the gear pump. The coating solution 14 cannot be sent well because of the phenomenon. In addition, there is a possibility to cause a shear of a molecule or a damage of the gear because of gearing of the gear when the molecule in the coating solution 14 is large (for instance, 1 μm or more).

Various types of conventional pressure gauges and flowmeters can be employed as the pressure gauge 48.

A preferably specified device corresponding to the composition of the coating solution can be employed as the depressurizing deairation device with a filter 50.

As the flowmeter 52, various types of conventional flowmeters can be used but a coriolis flowmeter is preferably employed.

FIGS. 2A and 2B are explanatory diagrams to describe the orifice. FIG. 2A is a perspective view of the orifice 54 and FIG. 2B is a cross sectional view of the orifice 54. The orifice 54 is the type which has one hole on a slit plate F of a thickness L.

S is a cross sectional area of the liquid sending pipe 42 in FIG. 2B, Sd is a cross sectional area of the hole of the slit plate F, A is an amplitude of a penetrating wave into the orifice 54 (the slit plate F), and B is an amplitude of a wave after penetrating. A transmission loss TL at the orifice 54 is shown by a formula 1 below.

$$\text{Transmission loss TL} = 10 \log\{1 + m^2(k \cdot |c|)^2/4\} \quad \text{(Formula 1)}$$

$$m = S/Sd$$

m: the term of the ratio between the pipe and the orifice
S: the cross sectional area of the pipe
Sd: the cross sectional area of the orifice $$k = 2\pi f/c$$

k: the term depending on the material in the pipe
f: the frequency of sound waves
c: the sound velocity in the medium Here, m is the ratio between the liquid sending pipe 42 and the cross sectional area of the hole Sd of the slit plate F, k is the term depending on the material inside the liquid sending pipe 42, f is the frequency of sound waves, and c is the sound velocity in the medium so the value of c is depending on a viscosity and a density of the medium.

Moreover, the transmission loss TL at the orifice 54 is shown by a formula 2 with the values A and B in FIG. 2B below.

$$TL = B/A \quad \text{(Formula 2)}$$

It is clear that the propagation of the wave after penetrating the orifice 54 is attenuated as the frequency f and the cross sectional area of the hole Sd of the slit plate F are made smaller as shown in the formulas 1 and 2. Thus, the liquid sending pulsation of the coating solution can be prevented efficiently by employing the orifice 54.

Additionally, an area ratio (1/m) between the cross sectional area of the hole Sd of the orifice 54 and the cross sectional area S of the liquid sending pipe 42 at the upper stream of the orifice 54 is preferably set to be 0.1 or less with the formula 1 above.

As already described, "orifice" means a circular plate which is set in the middle of a pipe line to throttle the flow path and to detect the changed pressure so that a flow rate can be measured with the hole on the circular plate, but the orifice is applied to control the flow rate not to measure the flow rate in the present specification.

A Reynolds number of the coating solution penetrating the orifice 54 can be obtained a formula below.

Re=UL/v U: characteristics velocity (m/s) L: characteristic length (m) v: dynamic coefficient of viscosity (m²/s) (However, U is the velocity of the liquid subjected to, in other word, the current velocity at the hole of the orifice, and L is the length of the subjected part, in other word, the hole diameter. V is kinetic viscosity which is the value obtained by dividing the viscosity by the density.)

It is preferred that the ratio between the cross sectional area of the hole Sd of the orifice and the cross sectional area S of the liquid sending pipe 42 at the upper stream of the orifice is 0.05 or less. A primary pressure of the orifice can be increased by setting the ratio between the cross sectional area of the hole Sd of the orifice and the cross sectional area S of the liquid sending pipe 42 at the upper stream of the orifice is 0.05 or less. Thereby, it is possible to absorb or decrease the pulsation of the orifice effectively.

Specifically, the primary pressure of the orifice 54 is preferably 50 kPa or more. More preferably, the primary pressure is 80 kPa or more, and the primary pressure of 100 kPa or more is much more preferable.

Figure 3A:
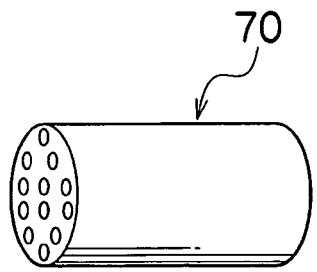
FIGS. 3A to 3D are schematic configuration diagrams which show another example of an orifice.
Figure 3B:
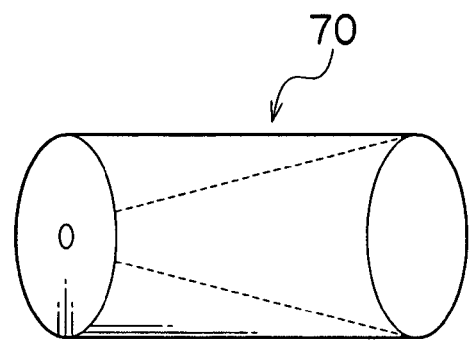

In the present embodiment, the type having one hole on the slit plate F as the orifice 54 is employed, but it can be taken various embodiments other than this. One example is shown in FIGS. 3A to 3D. FIG. 3A shows the orifice 54 with a plurality of holes. FIG. 3B is the orifice 54 with one hole which is tapered. In this way, it is possible to obtain the same effect as the present embodiment with the orifice 54 with a plurality of holes or one with the tapered hole.

Figure 3C:
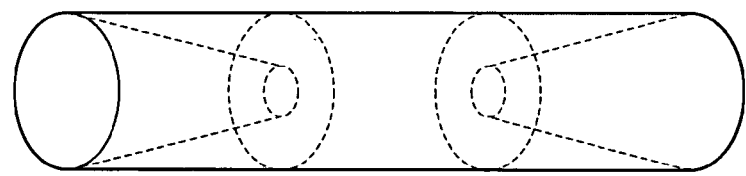
Figure 3D:
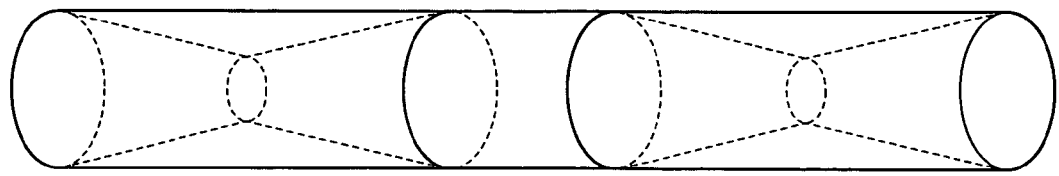

FIGS. 3C and 3D show the state that the plurality of the orifice 54 is provided at the liquid sending pipe 42. The axis of the hole in each orifice 54 may locate the same position as shown in FIGS. 3C and 3D, and also the axis of the hole may not locate the same position.

Figure 4A:
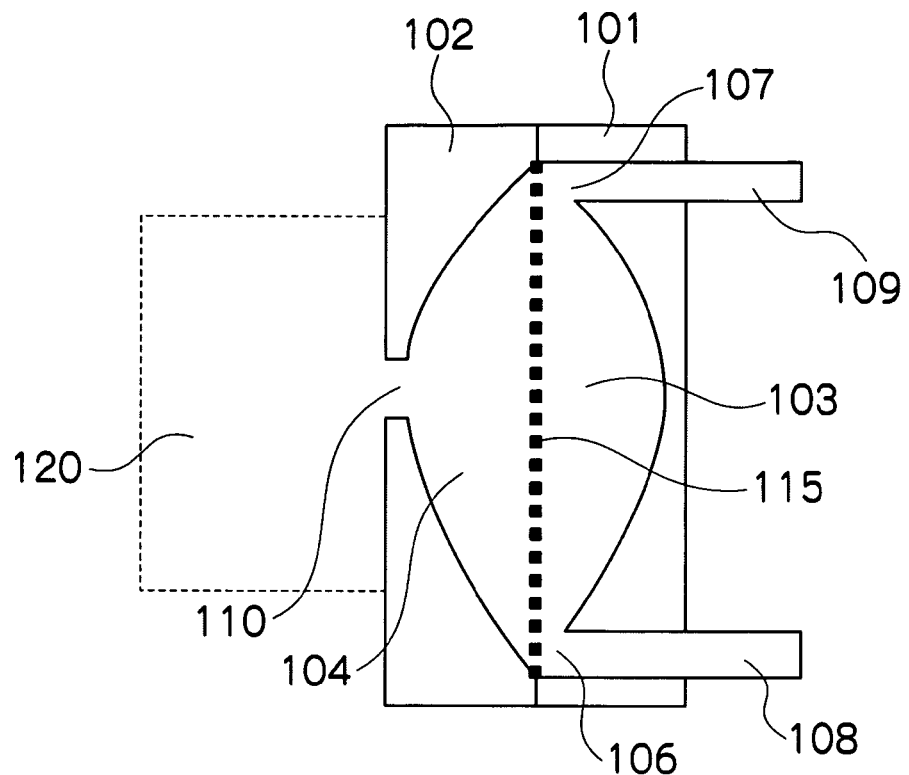
FIGS. 4A and 4B are schematic configuration diagrams which show a pulsation absorb device.
Figure 4B:
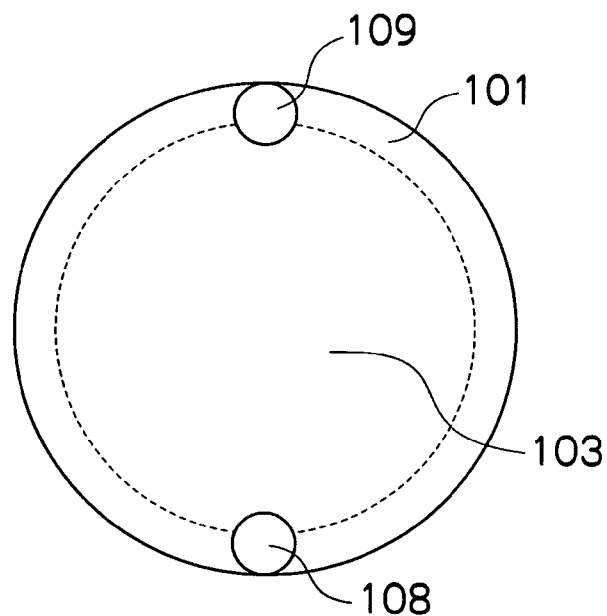

FIGS. 4A and 4B are configuration diagrams showing an outline of a pulsation absorb device. FIG. 4A is a cross sectional diagram of the side view and FIG. 4B is a cross sectional diagram of the front view.

The pulsation absorb device 56 includes a main body A 101, a main body B 102, and an elastic film 115 configuring a diaphragm arranged between the main body A 101 and the main body B 102.

A recess portion is formed on the main body A 101 and a first chamber 103 is configured with the recess portion and the elastic film 115. An inflow pipe 108 is connected to the first chamber 103 via an inflow opening 106 to supply a liquid to the first chamber 103. A discharge pipe 109 is also connected to the first chamber 103 via a discharge opening 107 to discharge the liquid. The subjected liquid to be sent fills the first chamber 103, the inflow pipe 108, and the discharge pipe 109 up.

A recess portion is formed on the main body B 102 and a second chamber 104 is configured with the recess portion and the elastic film 115. A pressure adjusting buffer 120 is connected via a vent 110 formed on the main body B 102.

The first chamber 103 and the second chamber 104 are separated by the elastic film 115 arranged between the main body A 101 and the main body B 102.

The elastic film 115 is made of a material having a characteristic such as JIS hardness 60 or more, and a strain of 175% or less with the temperature of 25° C., in atmospheric pressure, and the humidity of 50% RH. It is possible to adsorb the imperceptible pulsation in the liquid sending process, for example, the pulsation of 20 Pa effectively by choosing the material with the characteristic above as the elastic film 115.

The film does not extend fully and loose an elasticity capacity by the liquid sending pressure because the material described above has the hardness and strain restrictions at some level. An opposite side of the wetted surface of film is almost atmospheric pressure so that the imperceptible pulsation which is generated by the fluctuation of the film can be absorbed by the imperceptible fluctuation of the film.

Also, it is preferred that the elastic film 115 is the material having a good solvent resistance, for example, a fluorinated material.

A specific example of the material of the elastic film 115 having the characteristics above, it is possible to apply a fluorine-contained rubber (Viton®), a fluorine-contained rubber (AFLAS®), and a fluorine-contained rubber (Dyneon®). Especially it is preferred to apply a fluorine-contained rubber (DAI-EL. Perfluoro™).

The elastic film 115 is fixed by being sandwiched the circumference between the main body A 101 and the main body B 102. The elastic film 115 has a flexibility of the characteristics described above. Therefore, the elastic film 115 is displaced by the pulsation when the liquid with the pulsation flows into the first chamber 103.

On the other hand, the second chamber 104 is set to be in the state that an internal pressure of the second chamber 104 becomes near to atmospheric pressure. The internal pressure is adjusted to be atmospheric pressure±0.01 MPa in the present embodiment. If the elastic film 115 is displaced by the pulsation, a volume of the second chamber 104 is changed. However, the pressure which is changed by the volume change is absorbed by the pressure adjusting buffer 120 which is connected via the vent 110.

The internal pressure adjustment of the second chamber 104 is performed by opening the pressure adjusting buffer 120 partially, connecting a regulator to the pressure adjusting buffer 120, making the pressure adjusting buffer 120 to have a relative large volume in the closed state. Either case is acceptable as long as the displacement of the elastic film 115 occurred by the pulsation can be absorbed by the pressure adjusting buffer 120.

The elastic film 115 does not have to locate in the middle of the main body A 101 and the main body B 102 as long as the elastic film 115 is displaced by the pulsation. In other word, there is no difference if the elastic film 115 is displaced toward the first chamber 103 or toward the second chamber 104.

An elastic bag system which seals a gas having a predetermined volume by using the same material as the elastic film can be employed instead of the elastic film 115. The pulsation absorb device may be configured so that the elastic bag contacts the liquid. In this case, it is preferred that a gas supply system is added when the gas in the sealed system is soluble in the used liquid so that the effect can be maintained long time.

The inflow opening 106 is provided at the bottom of the first chamber 103 and the discharge opening 107 is provided at the upper part of the first chamber 103 of the pulsation absorb device 56. Bubbles and like which is generated at the inflow of the liquid moves to the upper part without staying the bottom of the first chamber 103. The bubbles and like which have moved to the upper part are discharged from the discharge opening 107 with the liquid. In this way, the bubbles and like stay in the first chamber 103 so that it is possible to prevent a bubble failure which is occurred by the bubbles discharged and mixed in the coating solution during the coating.

Next, the coating method by the coating process 10 which applies the liquid sending method and the liquid sending system of the present invention is described.

It is preferred to use a transparent plastic film as the web W (substrate) used for optical films such as an antireflection film. As an example of the material of the plastic film, cellulose ester (for example, triacetyl cellulose, diacetyl cellulose, propionyl cellulose, butyrylcellulose, acetyl-propionyl cellulose, and nitrocellulose), polyamide, polycarbonate, polyester (for example, polyethylene terephthalate. polyethylene naphthalate, polly 1,4-cyclohexane dimethylene terephthalate, polyethylene 1,2-diphenoxyethane-4,4'-dicarboxylate, and polybutylene terephthalate), polystyrene (for example, syndiotactic polystyrene), polyolefine (for example, polypropylene, polyethylene, and polymethylpentene), polysulfone, polyethersulphone, polyarylate, polyetherimide, polymethyl methacrylate, and polyetherketone are included.

In particular, triacetyl cellulose is used preferably. As a triacetyl cellulose film, publicly known ones, such as TAC-TD 80U (made by Fujifilm corporation), and the other disclosed by the journal-of-technical-disclosure number 2001-1745 are used preferably.

As the light transmittance of the web W, it is preferred that it is not less than 80%, and it is still more preferred that it is not less than 86%. As a haze of the web W, it is preferred that it is 2.0% or less, and it is still more preferred that it is 1.0% or less. As the refractive index of the web W, it is preferred that it is 1.4 to 1.7.

Although the thickness of the web W is not limited in particular, 30 to 150 μm is preferred, 40 to 130 μm is more preferred, and 70 to 120 μm is still more preferred.

It is not limited especially as a dispersion agent for the coating solution. It may be independent, or two or more kinds may be mixed and used.

The desirable dispersion agent is: aromatic hydrocarbons such as toluene, xylene, and styrene; chlorinated aromatic hydrocarbons, such as chlorobenzene and ortho-dichlorobenzene; chlorinated aliphatic hydrocarbons containing methane derivatives such as monochloromethane, and ethane derivatives such as monochloroethane, etc.; alcohols, such as methanol, isopropyl alcohol, and isobutyl alcohol; esters, such as methyl acetate and ethyl acetate; ethers such as ethyl ether, and 1,4-dioxane; ketones such as acetone, methyl ethyl ketone, methyl isobutyl ketone, and cyclohexanone; glycol ether such as ethylene glycol monomethyl ether; alicyclic hydrocarbon such as cyclohexane; aliphatic hydrocarbons such as normal hexane; or the mixture of aliphatic or aromatic hydrocarbons, etc.

Also in these solvents, especially as the dispersion agent for coating, ketone independent or the mixture of two or more kinds of ketone is preferred.

The liquid sending method and system of the present invention needs to control the liquid property especially the viscosity, and the surface tension of the moment of applying, because the maximum speed of the coating is greatly influenced by the liquid property.

The above-mentioned value shows the viscosity at the shear rate of the moment of being applied, because the viscosity changes with shear rates depending on the coating solution. It is preferable that a thixotropic agent is added to the coating solution, the viscosity is lowered at the time of applying with high shear, and the viscosity becomes higher at the time of the desiccation which hardly requires shear for the coating solution so that the generation of the unevenness at the desiccation is decreased.

Although it is not the liquid property, the quantity of the coating solution applied to the web affects the maximum speed to apply. The preferable quantity of the coating solution applied to the web is 2.0 to 10.0 ml/m$^2$. It is desirable that the speed of the maximum to apply is increased when the quantity of the coating solution applied to the web is increased. But a load at the desiccation becomes large if the quantity of the coating solution to apply to the web, so it is preferred to decide the optimal quantity of the coating solution to apply to the web according to the solution formula and process condition. Also, the quantity of the coating solution affects the Reynolds number Re and the pulsation rate (unevenness). The unevenness becomes relatively larger if the quantity of the coating solution is less even with the same pulsation rate. Thus, it has a great effect on a surface condition such as a step unevenness and the tolerance to the pulsation fluctuation becomes smaller.

It is preferred that a surface tension is in the range of 15 to 36 mN/m. Since the unevenness at the desiccation can be prevented, it is preferred that the surface tension is lowered by adding a leveling agent. On the other hand, since the speed of the maximum to apply drops if the surface tension is lowered too much, the range of 17 to 32 mN/m is preferred and the range of 19 to 26 mN/m is more preferred.

A process of coating the coating solution will be described below. The coating solution 14 which is pressure sent from the coating solution tank 40 by the liquid sending pump 46 is supplied to the slot die 12 via the liquid sending pipe 42 through a second pressure gauge 48, the depressurizing deairation device with a filter 50, the flowmeter 52, the orifice 54 and the pulsation absorb device. The pulsation absorb device 56 and the orifice 54 are provided at the upper stream of the slot die 12, so that the liquid sending pulsation of the coating solution can be effectively prevented.

The coated film is formed on the web W by coating with putting a bead of the coating solution 14 discharged from the slot die 12 to the web W which runs continuously with being supported by a coating roller 11. At this moment, it is possible perform the coating with a high film thickness uniformity without having a surface condition failure due to the liquid sending pulsation, since the liquid sending pulsation of the coating solution is prevented.

In other word, when the coating solution 14 is coated by the coating process 10 in FIG. 1, streak failures are reduced and the film thickness uniformity is improved. Therefore, according to the present embodiment, it is possible to produce optical films such as an antireflection film having the high film thickness uniformity without the surface condition failure due to the liquid sending pulsation.

Embodiment

The present invention is described more specifically by showing an embodiment below. A material, a producing condition, etc. in the embodiment below may be accordingly changed without departing from the spirit of the present invention. The scope of the present invention is not limited to the example below.

<Coating Solution>

The coating solution is adjusted with having compositions below soluble in methyl ethyl ketone of 107 parts by mass. The viscosity of the coating solution is adjusted to have a liquid viscosity of 1 to 10 mPa·s and the surface tension of 23 mN/m by controlling the additive amount of methyl ethyl ketone.

discotic liquid crystalline compound TE (1) . . . 41.01 parts by mass ethylene oxide modified trimethylolpropane acrylate (V#360, made by Osaka Organic Chemical Industry Ltd.) . . . 4.06 parts by mass cellulose acetate butyrate (CAB551-1, made by Eastman Chemical Company) . . . 0.9 parts by mass cellulose acetate butyrate (CAB531-1, made by Eastman Chemical Company) . . . 0.21 parts by mass fluoroaliphatic group containing polymer (MEGAFACE F780, made by DIC Corporation) . . . 0.14 parts by mass photopolymerization initiator (IRGACURE 907, made by Ciba-Geigy Limited.) . . . 1.35 parts by mass sensitizer (Kayacure DETX, made by Nippon Kayaku Co., Ltd.) . . . 0.45 parts by mass

[Chemical formula 1]

$$R: n\text{-}C_8H_{17}O\text{-}\text{[phenyl]}\text{-}C(=O)\text{-}O\text{-}$$

<Coating Condition>

The embodiment is performed with the example that the coating solution for an optical compensation film is coated with the coating process 10 of the optical compensation film shown in FIG. 1. The coating is performed with the coating speed of 40 m/min and the liquid sending flow rate of 385 to 500 cc/min.

The pulsation absorb device 56 is provided at the downstream of the orifice 54. The coating solution flows to the first chamber 103 formed in the pulsation absorb device 56 shown in FIG. 4A in order to path through from the lower side to the upper side. The elastic film 115 is provided so that the elastic film wets at the first chamber 103 and the opposite side of the film contacts gas (air). At the side of the second chamber 104 of the pulsation absorb device 56 in the present embodiment, the pressure adjusting buffer 120 is not pressurized in order to control the imperceptible pressure, not to be open system.

A differential pressure gauge A is provided between the pulsation absorb device 56 and the slot die 12 to measure the pressure fluctuation. The high precision pressure transmitter (model number, PTX620) of GE SENSING JAPAN, LTD. is used as a differential pressure gauge and connected to the data recorder (model number, NR-2000) of Keyence Corporation so that the liquid sending pulsation is measured.

The pulsation is measured after the pulsation absorb device by using an intensity peak of a pressure wave which is divided by an average pressure as the pulsation rate.

The table 1 shown in FIG. 5 is a table which shows the coating conditions and the evaluation results regarding to the embodiments 1 to 9 and the comparative examples 1 to 9.

The value of the pulsation which is obtained by calculating with the calculating method described before is written, and the coating film is evaluated with a sensory evaluation by comparing the step unevenness which occurs from the pulsation to a sample. The determination is done by piecing together the pulsation level and the surface condition evaluation. G is the level that the film has a good quality as a product, OK is the level that the film can be used as a product, and F is the level that the film cannot be used as a product.

The embodiments 1 to 9 having the orifice and the pulsation absorb device obtain the result of G or better regarding to the step unevenness and the determination.

On the other hand, the comparative examples 1 to 5, and 7 to 9 which have the Reynolds number of 2500 or more, the orifice only and do not have the pulsation absorb device obtain the result of F. It is clear that the imperceptible vibration can be absorbed or reduced effectively by providing the orifice and the pulsation absorb device.

The comparative example 6 is an example that the coating solution with the liquid viscosity of 5 mPa·s is used. When the liquid viscosity is relative high, the Reynolds number becomes small. The coating solution passing the orifice has the condition similar to laminar flow, so the imperceptible vibration hardly occurs. Therefore, it is estimated that the result of G or better is obtained regarding to the step unevenness and the determination according to the comparative example 6, even the comparative example 6 does not include the pulsation absorb device.

What is claimed is:

1. A liquid sending method comprising the steps of:
    sending a coating solution to a liquid sending pipe;
    passing the coating solution to an orifice which is provided at a part of the liquid sending pipe to prevent a vibration propagation; and
    passing the coating solution to a pulsation absorb device which is provided at a part of the liquid sending pipe, the pulsation absorb device being located downstream of the orifice, wherein
    the pulsation absorb device includes a first chamber that a liquid can flow in and out, a second chamber into which is introduced a gas, and a diaphragm which separates the first chamber and the second chamber;
    wherein a Reynolds number Re is not less than 2500 when the coating solution passes through a hole part of the orifice.

2. The liquid sending method according to claim 1, wherein an area ratio between a cross sectional area of the hole of the orifice and a cross sectional area of a flow path upstream of the orifice is not more than 0.05.

3. The liquid sending method according to claim 2, wherein a plurality of the orifice is provided at a part of the liquid sending pipe.

4. The liquid sending method according to claim 1, wherein a plurality of the orifice is provided at a part of the liquid sending pipe.

5. A liquid sending system comprising:
    a liquid sending pipe sending a coating solution;
    an orifice which is provided at a part of the liquid sending pipe to prevent a vibration propagation; and
    a pulsation absorb device which is provided at a part of the liquid sending pipe, the pulsation absorb device being located downstream of the orifice, wherein
    the pulsation absorb device includes a first chamber that a liquid can flow in and out, a second chamber into which is introduced a gas, and a diaphragm which separates the first chamber and the second chamber;

wherein the orifice has a Reynolds number Re not less than 2500.

6. A producing method of a film with coated layer comprising the steps of:
   sending a coating solution to a liquid sending pipe;
   passing the coating solution to an orifice which is provided at a part of the liquid sending pipe to prevent a vibration propagation;
   passing the coating solution to a pulsation absorb device which is provided at a part of the liquid sending pipe, the pulsation absorb device being located downstream of the orifice; and
   coating a substrate of the film with the coating solution;
   wherein the pulsation absorb device includes a first chamber that a liquid can flow in and out, a second chamber into which is introduced a gas, and a diaphragm which separates the first chamber and the second chamber;
   wherein a Reynolds number Re is not less than 2500 when the coating solution passes through a hole part of the orifice.

7. The producing method of a film with coated layer according to claim 6, wherein
   an area ratio between a cross sectional area of the hole of the orifice and a cross sectional area of a flow path upstream of the orifice is not more than 0.05.

8. The producing method of a film with coated layer according to claim 7, wherein
   a plurality of the orifice is provided at a part of the liquid sending pipe.

9. The producing method of a film with coated layer according to claim 6, wherein
   a plurality of the orifice is provided at a part of the liquid sending pipe.

10. A system for producing a film with coated layer comprising:
    a liquid sending pipe sending a coating solution;
    an orifice which is provided at a part of the liquid sending pipe to prevent a vibration propagation;
    a pulsation absorb device which is provided at a part of the liquid sending pipe, the pulsation absorb device being located downstream of the orifice; and
    a slot die which discharges the coating solution to a substrate of the film;
    wherein the pulsation absorb device includes a first chamber that a liquid can flow in and out, a second chamber into which is introduced a gas, and a diaphragm which separates the first chamber and the second chamber;
    wherein the orifice has a Reynolds number Re not less than 2500.

* * * * *